United States Patent Office 3,309,337
Patented Mar. 14, 1967

3,309,337
POLYETHYLENE AND POLYPROPYLENE STABILIZED WITH TETRAPHENOLIC COMPOUNDS
Ronald James Hurlock and Kenneth Marsden, Manchester, England, assignors to Imperial Chemical Industries Limited, London, England, a corporation of Great Britain
No Drawing  Filed June 7, 1962, Ser. No. 200,677
Claims priority, application Great Britain, June 12, 1961, 21,101/61; July 3, 1961, 23,914/61
8 Claims.  (Cl. 260—41)

This invention relates to polyhydric phenols, in particular certain tetraphenolic compounds, useful for the stabilisation of hydrocarbon polymers.

Hydrocarbon polymers deteriorate in physical properties when heated or exposed to air or oxygen. This deterioration is shown by loss of strength and development of brittleness and, in extreme cases, by discolouration.

We have now discovered that this deterioration can be retarded by incorporating in the polymer certain new tetraphenolic compounds, which may be obtained by condensing four molecular equivalents of certain phenols and one molecular equivalent of a dialdehyde.

According to our invention therefore there are provided new tetraphenolic compounds of the formula:

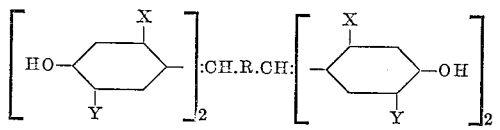

wherein R is a hydrocarbon group and X and Y are alkyl groups.

As examples of hydrocarbon groups represented by R there may be mentioned methylene, ethylene, o-, m-, and p-phenylene, and 2:2'-diphenylene.

As examples of alkyl groups represented by X and Y there may be mentioned methyl, ethyl, isopropyl, t-butyl, and t-octyl.

Examples of the tetraphenolic compounds of our invention include 1:4-bis[di-(5-t-butyl-4-hydroxy-2-methoxyphenyl)-methyl]benzene, 1:4-bis[di-(4-hydroxy-2:5 - dimethylphenyl)methyl]-benzene, 1:1:3:3-tetra(5-t-butyl-4-hydroxy-2-methylphenyl)propane, 1:1:4:4-tetra - (5-t-butyl-4-hydroxy-2-methylphenyl)butane, and 1:1:4:4-tetra-(4-hydroxy-2:5-dimethylphenyl)butane, 1:1:5:5-tetra(5-t-butyl-4-hydroxy-2-methylphenyl)pentane, and 1:1:5:5-tetra(4-hydroxy-2:5-dimethylphenyl) pentane.

The tetraphenolic compounds of our invention may be obtained by interacting substantially four molecular equivalents of a phenol with a dialdehyde in a solvent, for example an alcohol such as ethanol, a hydrocarbon such as benzene, toluene, or o-xylene, or other inert solvent in presence of an acidic catalyst such as zinc chloride or hydrogen chloride. Instead of the aldehyde there may be used a precursor such as an acetal for example 1:1:3:3-tetraethoxypropane(malonaldehydediacetal) or preferably a cyclic acetal for example 2:5-dimethoxytetrahydrofuran or particularly 2-ethoxy-3:4-dihydro-2H-pyran.

Suitable phenols for use in manufacturing the tetraphenolic compounds of our invention include 2:5-dimethylphenol, but the preferred phenols are those in which X is a primary alkyl group and Y is a tertiary alkyl group for example 2-t-butyl-5-methylphenol.

According to a further feature of our invention there is provided a process for the stabilisation of hydrocarbon polymers which comprises incorporating into the said polymer a tetraphenolic compound as hereinbefore described.

As hydrocarbon polymers there may be mentioned polyethylene and particularly polypropylene.

We have further discovered that the stabilising effect of the tetraphenolic compounds is considerably enhanced by certain sulphides or polysulphides and this provides a still further feature of our invention.

As sulphides there may be mentioned dialkyl sulphides, particularly wherein the alkyl groups are long chain such as dodecyl groups since the lower dialkyl sulphides are too volatile to be effective, di(substituted) alkyl sulphides, particularly esters of bis-carboxyalkyl sulphides such as dilauryl or dioctadecyl thiodipropionates or thiodibutyrates, dibenzylsulphides such as bis(2-hydroxy-5-methylbenzyl)-sulphide and bis(3-tert - butyl - 2 - hydroxy - 5-methoxybenzyl)sulphide, diaryl sulphides such as diphenyl sulphides, dicresyl sulphides, 2:2'-dihydroxy-5:5'-dimethyl diphenyl, diphenyldisulphide, dialkyldithiophosphates such as bis(diisopropyldithiophosphoryl)disulphide, and dialkyldithiophosphatomethylphenols.

The tetraphenolic compounds and, when used, the sulphide or disulphide may be incorporated into the polymer by any conventional procedure, for example by mixing the stabiliser and polymer powder by shaking, followed by milling at 170° C. or by dissolving the stabilisers in a solvent, adding the powdered polymer, removing the solvent, and then milling at 170° C.

When two or more components are used they may be added to the polymer in any order or may be mixed together before addition.

Suitable amounts of the tetraphenolic compound for use alone are from 0.001 to 5% of the weight of hydrocarbon polymer and preferably from 0.02 to 2%. In the presence of a sulphide or disulphide some reduction in usage of the tetraphenolic compound is possible.

Suitable amounts of the sulphide or disulphide are from 0.001 to 5% of the weight of hydrocarbon polymer and preferably from 0.02 to 2%.

The stabilising effect of the mixtures of tetraphenolic compounds and sulphides or polysulphides is enhanced, particularly when the polymer contains copper compounds or will come into contact with copper, by the addition of amines and derivatives of these. As examples of such amines and derivatives there may be mentioned 4:4'-diamino-diphenylmethane, alkylenedimethane, ethyleneimine polymers, N:N'-di(β-aminoethyl)piperazine, disalicylideneethylenediamine, and mercaptobenzimidazole. Suitable amounts of these amines or derivatives are from 0.02 to 2% of the weight of hydrocarbon polymer which may be incorporated into the polymer by any conventional procedure such as those hereinbefore described for the incorporation of the tetraphenolic compounds.

The polymers may contain other compounding ingredients such as colouring matter and the process of the invention is especially effective in polymers, particularly polyethylene or polypropylene, in which there is used as pigment a carbon black.

By the process of our invention polymers are obtained which are resistant to degradation by heat or by attack by oxygen. The stabilising effect being greater than that obtained from the materials hitherto used for this purpose. The invention is of particular importance in the case of polypropylene which in general requires a high temperature such as from 165 to 320° C. for working, for example, spinning, injection moulding or extruding.

The stabilising effect of comparable amounts of the sulphide or disulphide together with the tetraphenolic compound is greater than that of the tetraphenolic compound used alone and it seems clear that the two components have a synergistic effect upon each other.

The invention is illustrated but not limited by the following examples in which all parts and percentages are by weight unless otherwise stated.

EXAMPLE 1

Stabilisers as indicated below are incorporated into 100 parts of polypropylene by mixing on a mill at 170° C. followed by pressing into sheets of 0.45–0.55 mm. thickness at 185° C. The stabilised polypropylenes so obtained are then heated in air at 140° C. and the time to degrade the polypropylenes, as determined by the onset of embrittlement, are measured.

Mixes A contain 0.5 part of the tetraphenolic compound and mixes B contain 0.25 part of the tetraphenolic compound and 0.25 part of lauryl thiodipropionate. Polypropylene without stabiliser degraded in 1 to 3 hours and stabilised with 0.5 part of lauryl thiodipropionate in 450 hours.

|  | Mix A | Mix B |
|---|---|---|
| 1:4-bis[di(5-t-butyl-4-hydroxy-2-methylphenyl)methyl]benzene | 18 | 1,600 |
| 1:4-bis[(4-hydroxy-2:5-dimethylphenyl)methyl]benzene | 18 | 1,300 |
| 1:1:3:3-tetra(5-t-butyl-4-hydroxy-2-methylphenyl)propane | 162 | 1,600 |

EXAMPLE 2

Polypropylene is stabilised and the times to embrittlement measured as described in Example 1. Mixes C contain 0.5 part of the sulphides listed below and mixes D contain 0.25 part of the sulphides and 0.25 part of 1:1:3:3 - tetra(5 - t-butyl-4-hydroxy-2-methylphenyl)propane.

|  | Mix C | Mix D |
|---|---|---|
| 4-methyl-2-(O:O'-dinonyldithiophosphatemethyl)phenol | 240 | 1,150 |
| 4-methyl-2:6-bis(O:O'-dinonyldithiophosphatemethyl)phenol | 42 | 1,260 |
| Bis(dinonyldithiophosphorylmethylene)thiourea | 160 | 1,130 |

EXAMPLE 3

The 1:4 - bis[di-(5-t-butyl-4-hydroxy-2-methylphenyl)methyl]benzene used in Example 1 is prepared as follows.

*Method A.*—A mixture of 13.4 parts of terephthaldehyde, 65.6 parts of 2-tert-butyl-5-methylphenol and 22 parts of 36% aqueous hydrochloric acid is refluxed in 150 parts of ethanol for 45 minutes. The product crystallises out from solution as the reaction proceeds. The mixture is cooled and filtered and the residue is washed and recrystallised from ethanol to give 1:4-bis[di(5-t-butyl-4-hydroxy-2-methylphenyl)methyl]benzene, M.P. between a temperature of 324 and 325° C., and analysing to C, 82.2%; H, 8.8%. $C_{52}H_{66}O_4$ requires C, 82.75%; H, 8.76%.

*Method B.*—Dry hydrogen chloride is passed into a solution of 6.7 parts of terephthaldehyde and 32.8 parts of 2-tert-butyl-5-methylphenol in 100 parts of benzene at room temperature. After 3 hours the product is filtered off, washed, and recrystallised from benzene to give the product obtained by method A above.

EXAMPLE 4

The 1:1:3:3 - tetra(5-t-butyl-4-hydroxy-2-methylphenyl)-propane used in Examples 1 and 2 is prepared as follows.

A mixture of 164 parts of 2-tert-butyl-5-methylphenol, and 44.5 parts of 1-ethoxy-1:3:3-trimethoxypropane is dissolved in 100 parts of acetic acid. To this solution is added dropwise 118 parts of 36% aqueous hydrochloric acid. There is an immediate fall in temperature from 25 to 15° C. after which the temperature slowly rises to 27° C. during the remainder of the addition. The solution is stirred at a temperature between 20 and 25° C. for 45 min. and allowed to stand for 24 hours. Excess 30% aqueous sodium hydroxide is added and the mixture heated to 100° C. with stirring. The product, a dark red non-aqueous layer, is extracted with ether, and the extract is dried and evaporated and the residual semi-solid mass dissolved in 250 parts of ethanol. To this solution is added 25 parts of water and 15 parts of sodium hydrosulphite. The now pale yellow solution is drowned into water and the buff-coloured solid filtered off, washed, and dried to give 1:1:3:3-tetra-(5-t-butyl-4-hydroxy-2-methylphenyl)propane. The product on recrystallisation from aqueous methanol melts with decomposition between 290 and 292° and analyses for C, 80.7%; H, 9.0%. $C_{47}H_{64}O_4$ requires C, 81.5%; H, 9.25%.

EXAMPLE 5

A mixture of 10.8 parts of 2:5-dimethoxytetrahydrofuran, 53.7 parts of 2-tert-butyl-5-methylphenol and 1.5 parts of zinc chloride is stirred in benzene at room temperature. Hydrogen chloride is passed into the solution for 3 hours. The solid product is filtered off, washed with benzene and dried to give 1:1:4:4-tetra(5-tert-butyl-4-hydroxy-2-methylphenyl)butane melting with decomposition between 299 and 301° C.

EXAMPLE 6

The 1:4-[bis-(4-hydroxy-2:5-dimethylphenyl)methyl]benzene used in Example 1 is prepared as follows:

A mixture of 6.7 parts of terephthalaldehyde, 30.5 parts of crude 2:5-dimethylphenol (80% strength) and 12 parts of 36% aqueous hydrochloric acid is refluxed in 120 parts of ethanol for 2 hours. The solution on cooling deposits a crystalline solid which is filtered off, washed with ethanol, and dried to give 1:4-bis-[di-(4-hydroxy-2:5-dimethylphenyl)methyl]benzene, decomposing at a temperature between 345 and 350° C.

EXAMPLE 7

Polypropylene sheets are stabilised as described in Example 1. The sheets are heated at 150° C. in a regulated preheated airstream and the times to onset of embrittlement are determined. Mixes E contain 0.25 part of 1:1:4:4-tetra(5-t-butyl-4-hydroxy-2-methylphenyl)butane and 0.25 part of the listed sulphide, and mixes F contain 0.25 part of 1:1:5:5-tetra-(5-t-butyl-4-hydroxy-3-methylphenyl)pentane and 0.25 part of the listed sulphide.

|  | Mix E | Mix F |
|---|---|---|
| Dilauryl β:β'-thiodipropionate | 1,400 | 1,250 |
| Dilauryl γ:γ'-thiodibutyrate | 1,350 | 1,250 |
| Tetra-n-hexyl ester of di(β:γ-dicarboxypropyl)sulphide | 1,030 | 910 |

In comparison stabilized polypropylene degrade in 1–3 hours and polypropylene stabilised with 0.5 part of the phenolic compounds alone degraded in 72 and 96 hours respectively.

EXAMPLE 8

The 1:1:5:5-tetra(5-t-butyl-4-hydroxy-3-methylphenyl)pentane used in Example 7 is prepared as follows.

Dry hydrogen chloride is passed with a stirred solution at room temperature of 6.6 parts of 2-ethoxy-3:4-dyhydro-2H-pyran and 33.8 parts of 2-t-butyl-5-methylphenol in 25 parts of benzene containing 1 part of anhydrous zinc chloride. After 3 hours 1:1:5:5-tetra(5-t-butyl-4-hydroxy-2-methylphenyl)pentane is collected by filtration. After crystallisation from aqueous ethanol this melts at a temperature between 251 and 252° C., and on analysis contains carbon 81.5% and hydrogen 9.3%; $C_{49}H_{68}O_4$ requires carbon 81.7% and hydrogen 9.5%.

EXAMPLE 9

Stabilisers as indicated below are incorporated into polyethylene by milling the polymer at 110° C. and adding the stabiliser to the molten polymer. The polymer is then suspended on a stainless steel gauze at 150° C. in an atmosphere of oxygen and the rate of oxygen absorption measured. An induction period is observed before uptake of oxygen and this induction period is taken as a measure of the degree of stabilisation.

Stabiliser: Inductor period (Hours)
None _____ 4
0.1% of dicresylolpropane _____ 25
0.05% of dilauryl β:β'-thiodipropionate, 0.05% of 1:1:4:4-tetra(5-t-butyl-4-hydroxy-2-methylphenyl)butane _____ 70

EXAMPLE 10

0.5% of dilauryl β:β'-thio-dipropionate, 0.5% of 1:1:4:4-tetra-(5-t-butyl-4-hydroxy-2-methylphenyl)-butane, 100 parts per million of copper in the form of copper stearate and 0.5% of the amines listed below are incorporated into polypropylene at 170° C. on an open roll mill. The polypropylene is pressed at 180° C. into sheets of thickness 0.45–0.55 mm. which are heated at 150° C. in a regulated preheated stream of air. The time to embrittlement of the polymer is determined.

Amine: Time (hours) to embrittlement
None _____ <400
4:4'-diaminodiphenyl-methane _____ 1080
Disalicylidemethylenediamine _____ 900
Triethylenetetramine _____ 840
Diethylenetriamine _____ 1000
N:N'-di(β-aminoethyl)-piperazine _____ 1000

What we claim is:
1. A composition comprising a hydrocarbon polymer selected from the group consisting of polyethylene and polypropylene having incorporated therein as a stabilizer, a tetraphenolic compound having the formula

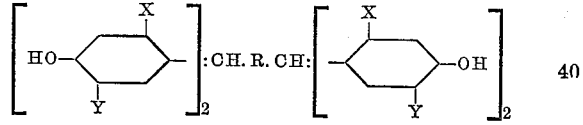

wherein R is a hydrocarbon selected from the group consisting of methylene, trimethylene, ethylene, o-, m-, and p-phenylene and 2:2'-diphenylene and X and Y are alkyls having from 1 to 8 carbon atoms, said stabilizer being present in amounts from 0.001% to 5% based on the weight of said hydrocarbon polymer.

2. A composition according to claim 1 into which has also been added in amounts from 0.001% to 5% based on the weight of said hydrocarbon polymer, a member selected from the group consisting of di-higher alkyl sulfides, esters of bis-carboxyalkyl sulfides, dibenzyl sulfides, diaryl sulfides, dialkyldithiophosphates and dialkyldithiophosphatomethylphenols.

3. A composition according to claim 2 into which has also been added in amounts from 0.02% to 2% based on the weight of said hydrocarbon polymer a member selected from the group consisting of 4,4'-diaminodiphenylmethane, alkylenediamines, ethyleneimine polymers, N,N'-di(3-aminoethyl) piperazine, disalicylideneethylenediamine and mercaptobenzimidazole.

4. A composition according to claim 1 wherein R is an ethylene group.

5. A composition according to claim 1 wherein R is a trimethylene group.

6. A composition according to claim 1 wherein X is a primary alkyl group and Y is a tertiary alkyl group.

7. A composition according to claim 6 wherein X is a methyl group and Y is a tertiary butyl group.

8. Stabilised hydrocarbon polymers as claimed in claim 1 containing carbon black.

References Cited by the Examiner

UNITED STATES PATENTS

| | | | |
|---|---|---|---|
| 2,482,748 | 9/1949 | Dietzler | 260—619 |
| 2,730,502 | 1/1956 | Beaver et al. | 252—107 |
| 2,779,800 | 1/1957 | Holm et al. | 260—45.95 |
| 2,862,787 | 9/1958 | Goodman et al. | 260—45.95 |
| 2,985,617 | 5/1961 | Salyer et al. | 260—45.95 |
| 3,196,185 | 7/1965 | Ranson | 260—49.95 |
| 3,207,794 | 9/1965 | Haines et al. | 260—619 |
| 3,210,428 | 10/1965 | Guest et al. | 260—619 |

FOREIGN PATENTS 1,248,217  10/1960  France.

LEON J. BERCOVITZ, *Primary Examiner.*

H. E. TAYLOR, *Assistant Examiner.*